J. A. JANOSEK.
ATTACHMENT FOR CULTIVATORS, &c.
APPLICATION FILED SEPT. 1, 1911.
1,031,121.
Patented July 2, 1912.
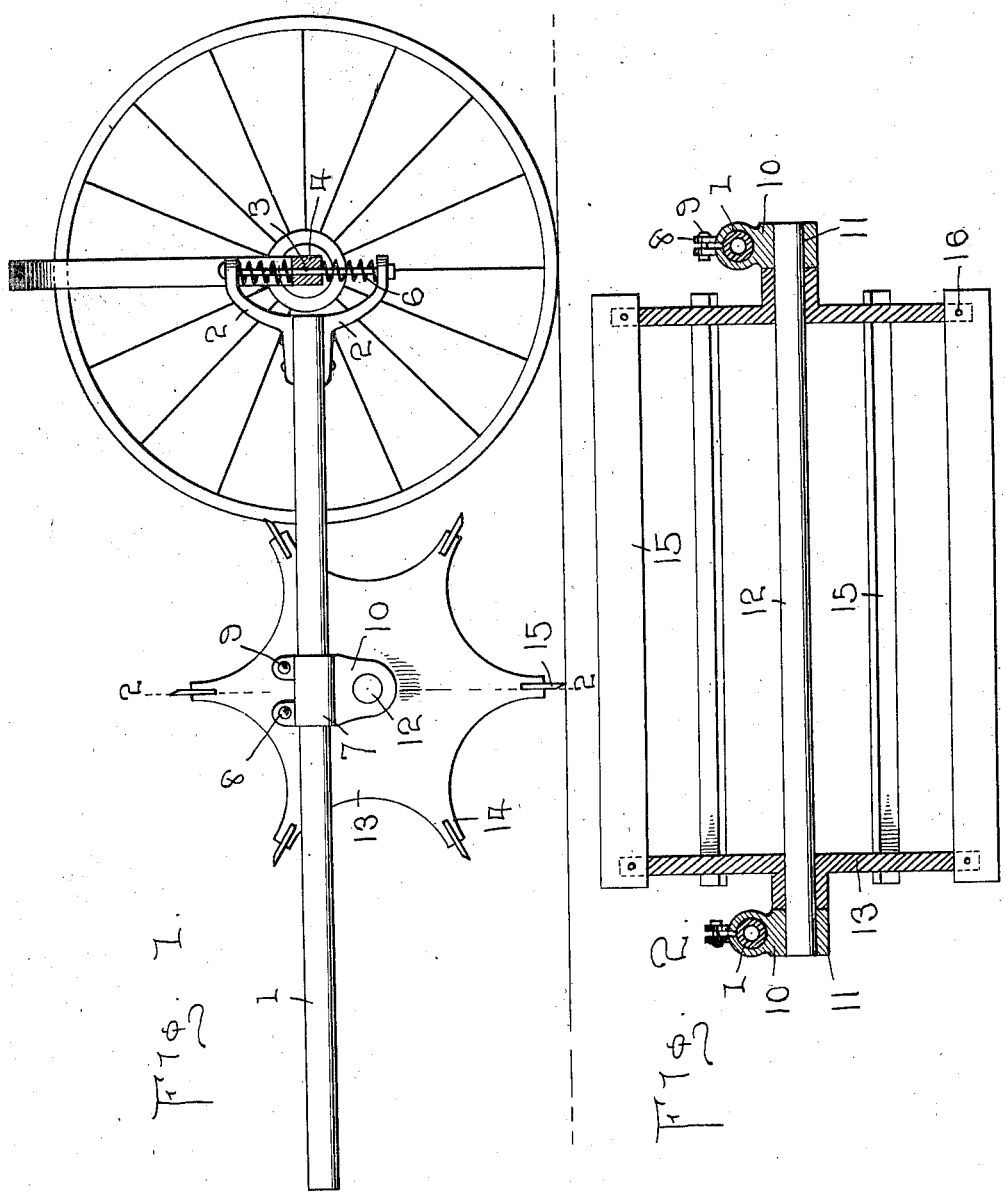
WITNESSES:
INVENTOR
J. A. Janosek
BY
W. J. Fitz Gerald
Attorneys

UNITED STATES PATENT OFFICE.

JOHN A. JANOSEK, OF BARTLETT, TEXAS.

ATTACHMENT FOR CULTIVATORS, &c.

1,031,121.  Specification of Letters Patent.  Patented July 2, 1912.

Application filed September 1, 1911. Serial No. 647,221.

*To all whom it may concern:*

Be it known that I, JOHN A. JANOSEK, a citizen of the United States, residing at Bartlett, in the county of Bell and State of Texas, have invented certain new and useful Improvements in Attachments for Cultivators, &c.; and I do hereby declare the following to be a full, clear, and exact description of the invention, such as will enable others skilled in the art to which it appertains to make and use the same.

This invention relates to cultivators and more particularly to attachments therefor.

An object of the invention is to provide an attachment for cultivators whereby the latter may be converted into stalk cutters.

Another object is to provide a cutter attachment which may be applied to cultivator frames of the ordinary type.

Another object is to provide a cutter attachment which may be connected with farming machines of various types and which will be positive and effective in the performance of its duty.

Another object is to provide a stalk cutter of the above stated nature, which may be readily connected with or disconnected from an ordinary cultivator and which will readily yield should the blades come in contact with a stone or other obstruction, and, another object is to devise a stalk cutter of this nature, which will be of simple form, positive in operation and which may be readily positioned between the shafts or beams of the usual cultivator frame and clamped in position or which may be removably secured to specially provided shafts or beams adapted to be connected with the frame of the cultivator.

Other objects and advantages will be hereinafter set forth and pointed out in the specification and claim.

In the accompanying drawings which are made a part of this application, Figure 1 is a side view of my cutter attachment connected to a cultivator, while, Fig. 2 is a cross sectional view on the line 2—2 of Fig. 1.

Referring to the drawings in which similar reference numerals designate corresponding parts throughout the several views, 1 represents the parallel bars or shafts which may be formed of hollow tubing or may be solid, as desired. The bars 1 are preferably round, in cross section, the purpose of which will presently appear. To the opposite ends of the bars 1 are secured the curved bracket arms 2, two arms being secured to one end of each bar 1, opposite one another. Through the outer ends of each pair of arms 2 is passed a pin or bolt 3 which is also secured through a horizontal portion of the cultivator beam or axle 4, as the case may be. A spring 6, preferably a coil spring is placed upon the pin 3 between the axle or beam 4 and the adjacent bracket 2.

Clamped upon each bar 1, between the ends thereof, is a bearing bracket 7, which is split and bent to form the opposite ears or flanges 8 clamped together by suitable clamping bolts 9 to hold the brackets 7 in position upon the bars 1. Each bracket 7 is provided with a depending portion 10 provided with a suitable bearing 11 therethrough to receive one end of a shaft 12.

Upon each end of the shaft 12, inwardly of the depending portions 10 of the brackets 7, are the cutter heads 13, the edges of which are cut to present the points 14, which are suitably split to receive the opposite ends of the cutter blades 15, the ends of the blades being held in position by means of the pins 16 passed therethrough and through the split points 14, as will be clearly understood.

The outer ends of the rods 1 are free to move up and down and the springs 6 tend to resiliently retain said bars in a horizontal position and adsorb all shocks incident to the cutter blades 15 striking stones or other structures.

It will be evident that this attachment may be readily connected with any cultivator of ordinary form and that the shaft 12 will be caused to rotate by the moving forward of the bars 1, thus causing the cutter blades 15 to cut the stalks as the latter are forced downwardly by the points 14 of the cutter heads 13, and by the blades 15, as will be clearly understood.

The brackets 7 may be adjusted longitudinally of the bars 1, as desired and it will be apparent that shovels, cultivators, etc. may be suspended from the bars 1, if desired.

It will thus be seen that I have provided a stalk cutter attachment which may be readily connected with farming implements of various types to convert the same into stalk cutters, thus eliminating the necessity of purchasing a complete machine to perform this work.

Owing to the small number of parts included in this attachment and the simple formation thereof it will be evident that the cutter may be readily assembled or disassembled and that any of the parts may be easily and cheaply replaced should they become worn or broken. Further, each blade may be removed or replaced independently of the other blades when it is desired to sharpen the edge thereof. Therefore, this cutter attachment will be highly efficient in use, and it will save time, labor and expense.

What I claim is:

A cutter attachment for farming implements comprising parallel bars having oppositely disposed bracket arms secured to one end thereof, said bracket arms being provided with resilient means for connection, with the implement to allow the bars to move in a vertical plane, supporting brackets removably and adjustably secured upon said bars, a shaft mounted in said brackets below and at right angles to the bars, and stalk cutting mechanism mounted upon said shaft.

In testimony whereof I have signed my name to this specification in the presence of two subscribing witnesses.

JOHN A. JANOSEK.

Witnesses:
 WILHELM KYCHETSKI,
 JAHN JANOSEK.